United States Patent [19]

Torii et al.

[11] Patent Number: 5,378,548

[45] Date of Patent: Jan. 3, 1995

[54] MAGNETIC RECORDING MEDIUM AND ITS MANUFACTURING PROCESS

[75] Inventors: Hideo Torii; Eiji Fujii; Masumi Hattori; Masaki Aoki, all of Osaka; Kiyoshi Kuribayashi, Yamanashiken, all of Japan

[73] Assignee: Matsushita Electric Industrial Co., Ltd., Osaka, Japan

[21] Appl. No.: 713,285

[22] Filed: Jun. 11, 1991

[30] Foreign Application Priority Data

| Jun. 11, 1990 [JP] | Japan | 2-151955 |
| Nov. 19, 1990 [JP] | Japan | 2-313519 |
| Nov. 19, 1990 [JP] | Japan | 2-313521 |

[51] Int. Cl.$^6$ .................................. G11B 5/66
[52] U.S. Cl. .................... 428/694 TS; 428/692; 428/694 TP; 428/695; 428/900
[58] Field of Search ......... 428/692, 695, 900, 694 TS, 428/694 TP

[56] References Cited

U.S. PATENT DOCUMENTS

| 4,198,467 | 4/1980 | Reade | 428/410 |
| 4,232,071 | 11/1980 | Terada et al. | 428/64 |
| 4,717,584 | 1/1988 | Aoki et al. | 427/38 |
| 4,839,226 | 6/1989 | Sawada et al. | 428/336 |
| 4,883,710 | 11/1989 | Machida | 428/336 |
| 4,953,385 | 9/1990 | Aoki et al. | 72/462 |
| 4,966,821 | 10/1990 | Kawashima et al. | 428/694 |
| 4,975,324 | 12/1990 | Torii et al. | 428/64 |
| 5,068,062 | 11/1991 | Maro et al. | 428/408 |
| 5,079,062 | 1/1992 | Masuda et al. | 428/64 |
| 5,093,173 | 3/1992 | Nakagawa et al. | 428/64 |
| 5,094,898 | 3/1992 | Morita et al. | 428/64 |
| 5,120,604 | 6/1992 | Nakamura | 428/403 |

FOREIGN PATENT DOCUMENTS

| 0265246 | 4/1988 | European Pat. Off. |
| 59-157830 | 2/1983 | Japan . |
| 60-191428 | 9/1985 | Japan . |

OTHER PUBLICATIONS

Fujii et al., IEEE Translation Journal on Magnetics in Japan vol. 4, No. 8, Aug. 1989.

Primary Examiner—Paul J. Thibodeau
Assistant Examiner—H. Thi Lê
Attorney, Agent, or Firm—Wenderoth, Lind & Ponack

[57] ABSTRACT

A magnetic recording medium, comprising; a 2-layer film formed on a glass disk substrate as an under layer composed of an amorphous oxide or NaCl oxides like a NiO or CoO and the like, or any soft magnetic oxide of Mn-Zn ferrite, Ni-Zn ferrite and the like, or a combination of those 2 materials; a magnetic recording medium formed thereon composed of a Co ferrite perpendicular magnetic film of a columnar structure; and a structure formed thereon with a lubricant layer medium. This magnetic recording medium is used for a magnetic rigid disk apparatus. The substrate is made by press-molding the glass plate at a high temperature. The under layer film and Co ferrite film are composed of vapors of organic material compounds and oxygen as their raw materials, and made by a plasma assisted CVD method.

2 Claims, 7 Drawing Sheets

MAGNETIC RECORDING MEDIUM AND ITS MANUFACTURING PROCESS

BACKGROUND OF THE INVENTION

1. Field of the Invention

The present invention relates to a magnetic recording medium and its manufacturing process which makes high density magnetic recording possible.

2. Description of the Prior Art

Magnetic recording media are now widely used in the form of tapes for audio equipment and video recorders, or in the form of a disk like a floppy disk and a magnetic rigid disk. In today's highly developed intelligent society, the volume of information to be stored is increasing year by year, therefore, the demand for a larger storage unit and higher density are also increasing. For example, in a magnetic rigid disk unit as used for computer peripheral units, a trend towards both a larger storage volume and a smaller physical volume is shown year by year, furthermore, development towards a higher density and smaller size magnetic rigid disk used for a magnetic rigid disk unit is progressing. With the increasing demand toward higher density, the recording medium materials used for the magnetic rigid disk have also changed. The magnetic recording medium as conventionally used has been an application-type medium which was made by applying a needle-shape magnetic powder together with an organic binder. Recently, instead of using the above methods, a thin film-type medium was placed on the market and has widely been used. Such media have been made by directly forming the magnetic film without using an organic binder on a disk substrate, through the use of such means as plating as well as vacuum sputtering methods.

Instead of using an application-type magnetic rigid disk which is applied with the needle-shape magnetic powder of gamma iron oxide onto an aluminum disk substrate, a rigid magnetic disk of Co-Ni/Cr alloy thin film has come to be in wide use.

As one example of a magnetic rigid disk used with the existing Co-Ni/Cr alloy thin film, an explanation follows of the structure and the production method of a thin-film magnetic rigid disk made by means of the vacuum sputtering method. First, an aluminum circular disk mirror polished as a disk substrate is prepared. On its surface, a Ni-P film of about 20 $\mu$m is formed by a plating method. Then, the surface is polished up. In this instance, a texture is made on the surface. Then, Cr thin film of about 0.1 $\mu$m thick is made by a vacuum sputtering method with a Co-Ni thin film (less than 0.008 $\mu$m) formed as a magnetic layer. Since the Co-Ni thin film of the magnetic layer by itself has such problems in corrosion resistance as oxidation, a protective film layer (about 500-800 Å) of $SiO_2$ or amorphous carbon and the like are formed for the purpose of improving the corrosion resistance. Furthermore, a coating layer (about 100-500 Å) of lubricant is formed on the surface, and then a magnetic rigid disk of Co-Ni/Cr alloy thin film is built up.

The magnetic rigid disk structure of Co-Ni/Cr alloy thin film is composed of 6 layers of "lubricant layer/protective layer/Co-Ni alloy magnetic layer/Cr layer/P plating layer/Aluminum substrate". However, this structure has inherent disadvantages such as making the production process more complicated.

Also, as the aforementioned magnetic rigid disk is a longitudinal recording medium, an effort to further increase the recording density for shorter recording wave lengths makes the recording difficult due to influence from a magnetic field. Therefore, studies have been conducted with regard to improved magnetic recording media for use in a perpendicular recording system; one such study researched the effects of a Co-Cr thin film medium on a method for a Co-Cr thin film medium on a method for record reproduction in which a magnetic head makes contact with the medium without lifting the magnetic head itself.

This Co-Cr alloy thin film medium has such disadvantages as being easily subject to scars when sliding against the magnetic head. Since the Co-Cr alloy thin film is a metal thin film, in the same manner as Co-Ni/Cr alloy thin film, there is also a problem with corrosion and oxidation resistance, and, therefore, for the Co-Cr alloy thin film medium, there has been such great problems as assuring reliability for improving passware endurance and corrosion resistance.

Various schemes have been devised to solve this problem. One of them is a method to provide a protective layer of amorphous carbon on a Co-Cr thin film surface. In addition, a method to provide a protective layer of cobalt oxide on the Co-Cr thin film surface has been contrived.

In this manner, efforts are being made for improving the reliability in endurance and corrosion resistance in passware, by building up a coating film on the surface of Co-Cr alloy thin film medium.

In a magnetic rigid disk device, making the running height (flying height) as low as possible for the magnetic disk of the magnetic head will lead to improvement of the recording density owing to a decrease in the loss of output (spacing loss) due to spacing, i.e. an interval between magnetic head and magnetic disk. In order to lower the flying height, excellent smoothness is required for the substrate surface to protect the magnetic head from crashing. With conventional disk substrates, almost all are used with aluminum substrates. However, aluminum substrates are limited by the ability to obtain an adequate surface smoothness, thus it has been difficult to improve the smoothness. In this connection, smooth glass substrates are easily obtained and are nowadays thought to be effective. However, the glass substrates have disadvantages such as being expensive compared with aluminum substrates due to complexity of production process.

Recently, in order to make high recording density possible, running at a flying height volume of about 0.05–0.1 $\mu$m has been considered necessary.

However, there are problems of changes in properties resulting from oxidation and the like in any of the aforementioned Co-Ni/Cr thin film media or Co-Cr thin film media, which need a protective film layer for the purpose of promoting corrosion resistance. In this sense, once a protective film layer is provided, the interval between a magnetic recording medium (magnetic layer) and a magnetic head is, in terms of magnetism, widened by the thickness of the protective layer even if the flying height is decreased, which results in increased spacing loss and has thereby stunted the progress toward higher density media. Besides, formation of the protective film increases the complexity of producing recording media.

SUMMARY OF THE INVENTION

An object of the present invention is to provide a magnetic recording medium in a magnetic rigid disk form which is, like a conventional alloy magnetic thin film disk, excellent in reliability without need of a protective layer and has a component of perpendicular magnetic recording capable of complying with high density magnetic recording, and also its production method.

In order to achieve the aforementioned object, the present invention is not a magnetic recording medium composed of an alloy (metallic) magnetic thin film medium material which needs a conventional protective film layer, but is a magnetic recording medium using a magnetic recording medium material of a thin film oxide containing such chemicals as iron and cobalt, having a perpendicular recording component capable of recording with higher density compliance and a columnar structure which consists mainly of an oxide of a spinel crystal structure; and an underlayer film which is a different kind of oxide thin film is formed on a glass substrate, the thin film of the medium is formed on the under layer film, and also on its surface a lubricant layer is formed, thus making a magnetic recording medium in magnetic rigid disk form of a film structure. Besides, the present invention is a glass disk substrate manufacturing process made by heating a glass material and press molding; a thin film forming process for an oxide magnetic recording material obtained by a plasma enhanced MO-CVD method and an oxide material for its under layer film, and a production method for the aforementioned magnetic recording medium produced through a lubricant film layer forming process by lubricant application. The inventors have discovered a production method for a thin film of magnetic oxides capable of being used as a magnetic recording medium through use of plasma enhanced MO-CVD method by using a MO raw material (organometallic raw material) which represents $\beta$-diketone complex such as metal acetylacetonate like iron, cobalt and the like. (M. Aoki et al., U.S. Pat. No. 4,717,584)

Furthermore, by controlling the film forming conditions of the plasma enhanced MO-CVD method, a perpendicular magnetized thin film can be obtained which consists of a spinel oxide magnetic body whose only form is minute columnar grains densely grown onto the under layer substrate. (H. Torii et al., U.S. Pat. No. 4,975,324, and E. Fujii et al., IEEE Translation Journal on Magnetics in Japan, vol. 4, No. 8, p 512–517 (1989)).

The film material thus obtained is an oxide material having a spinel crystal structure, the same material as magnetic ceramics generally called ferrite. Since ferrite is a ceramic oxide, it is not only excellent in acid resistance but also in weatherability with sufficient hardness. Therefore, a magnetic recording medium thin film of spinel oxides as used in the present invention is likewise a magnetic recording medium thin film having excellent characteristics in acid resistance, weatherability and wear resistance. Therefore, as a protective film layer is not required for the purpose of protecting the magnetic thin film as required for the conventional alloy magnetic recording medium thin film material used in magnetic rigid disk form, a loss of head output (spacing loss) by spacing is noticeably reduced, as the interval (spacing) between the running magnetic head and magnetic recording medium thin film can be directly and effectively reduced by reducing the flying height for high density recording compliance, thereby larger capacity magnetic rigid disks can be made. In addition, the film structure of magnetic rigid disks becomes simpler.

Furthermore, as the magnetic recording medium thin film used in the present invention has a perpendicular magnetic component, the influence of decreasing magnetic field can be reduced for the short wave recording of higher density recording.

For the thin film magnetic oxide recording medium which contains such chemical components as iron and cobalt, the use of a different kind of thin film oxide as a under layer film helps make the control of crystal orientation and columnar diameter of columnar structure grains remarkably easy, and the magnetic recording characteristics are also improved. Product yields can also be improved in the production.

Using a plasma enhanced MO-CVD method enables the thin film oxide of the under layer film and magnetic oxide thin film to be continuously formed even with changing the gas of raw material. Formation of multi-structured thin film oxides can be easily made even on a glass disk substrate. Therefore, as mentioned earlier, compared with a magnetic rigid disk of the conventional alloy magnetic material of complicated film structure (6-layer structure), a magnetic recording medium of remarkably simple film structure can be made which is a magnetic disk form of "lubricant layer/magnetic oxide thin film layer/oxide thin film under layer/glass substrate".

The inventors also found in the past a method to produce a disk type glass substrate by press forming the glass block material with heat through use of a pair of die presses. (M. Aoki et al., U.S. Pat. No. 4,953,385). This is a remarkably process-saving production method compared with the magnetic recording medium production method of a magnetic rigid disk form of alloy magnetic material which represents the conventional Co-Ni/Cr alloy magnetic disk. In the inventors' process, a glass disk substrate to be used for the magnetic recording medium of the present invention is made with heat through a press molding method by first heating a glass block material using a pair of press dies, continuously forming the aforementioned thin film under layer and the magnetic thin film on the substrate through the plasma enhanced MO-CVD method, and applying lubricant to the surface thereof to form a lubricant layer.

With the above structure, the magnetic rigid disk with the film structure of the present invention is, when the flying height of the magnetic head becomes lowered, able to get a high head output even at a short wave area compared with the conventional alloy magnetic rigid disk, thus making it possible to cope with the higher density recording and the larger capacity of a magnetic rigid disk device. Also, the film structure is simple compared with the alloy disk structure, and according to the production process of the present invention the production process can also be remarkably reduced. Eliminating process steps allows the production of magnetic recording medium capable of coping with higher density recording to be made with a lower cost compared with the conventional processes.

Figure 1:
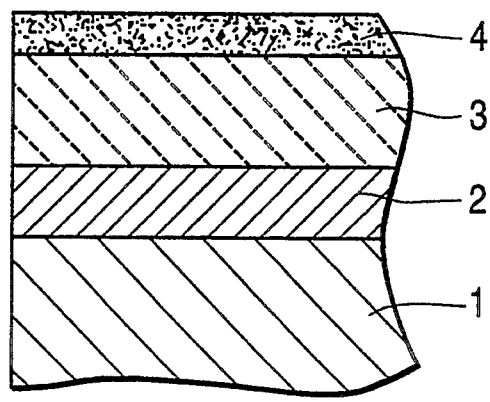
FIG. 1 shows an enlarged sectional view of the main area of the magnetic recording medium of a magnetic rigid disk form referred to as embodiment 1 of the present invention.

KEY TO FIGURES 1 glass disk substrate
2 CoZnFe amorphous oxide film
3 Co ferrite film
4 Lubricant layer
5 and 6 press dies
7 Raw material glass circular disk
8 and 9 heater for press dies
10 supply jig for a raw material glass circular disk
11 piston cylinder for an upper die
101 piston cylinder for a lower die
102 preheating tunnel furnace
103 inlet for taking out a disk
12 reaction chamber
13 electrode
14 exhaust system
15 high frequency wave power source
16, 17, 18, 19 and 20 vaporizer
21, 22, 23, 24 and 25 first valve
26, 27, 28, 29 and 30 second valve
31 carrier gas cylinder
32 reactive gas cylinder
33 heater for substrates
34 Co ferrite/CoZnFe amorphous oxide magnetic recording medium
35 Co-Ni/Cr alloy thin film medium
36 Co ferrite monolayer medium
37 NiO film
38 Co ferrite/NiO magnetic recording medium
39 Mn-Zn ferrite film
40 Co ferrite/Mn-Zn ferrite magnetic recording medium
41 Co ferrite/Mn-Zn ferrite/CoZnFe amorphous oxide magnetic recording medium
42 Co ferrite/Mn-Zn ferrite/NiO magnetic recording medium

DESCRIPTION OF THE PREFERRED EMBODIMENTS

Embodiment 1

Explanation of one embodiment of the present invention follows with reference to drawings.

FIG. 1 shows the structure of the first embodiment of the magnetic recording medium of the present invention, in which numeral 1 represents a glass disk substrate, numeral 2 represents a CoZnFe amorphous oxide film layer, numeral 3 represents a Co ferrite film, and numeral 4 represents a lubricant layer.

First, a glass disk substrate for magnetic disk was made as follows by a press molding method.

By preparing a highly dense sintered columnar body of tungsten carbide (WC) [composition: $WC/Co/Cr_3C_2=91/8/1$ (wt %)] by 98 mm in diameter and 30 mm in height followed by mirror polish on one bottom surface, a platinum-iridium alloy film of 3 μm in thickness was formed by use of a high frequency sputtering device. After forming the alloy film, the sputtered film surface was mirror polished. 2 pieces of tungsten carbide sintered blocks were prepared by coating the mirror finished surface thus made with platinum-/iridium alloy. A pair of press dies consisting of 2 platinum-iridium alloy coated tungsten carbide sintered blocks having a mirror finished surface.

Figure 2:
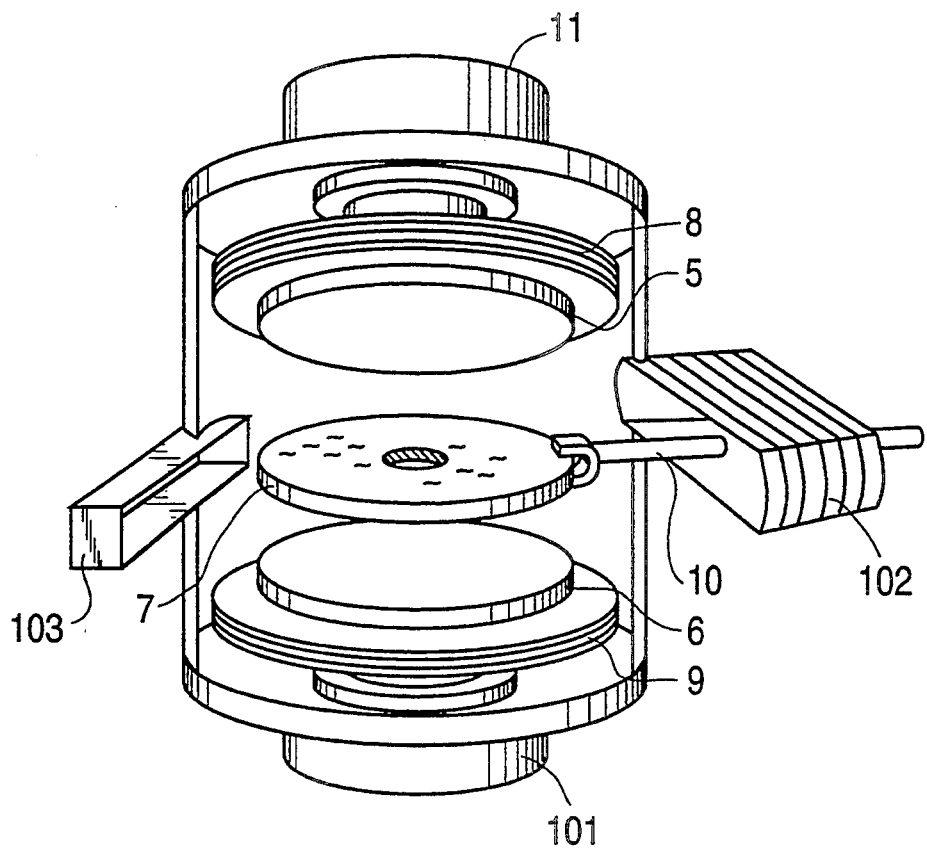
FIG. 2 shows a schematic diagram of a press machine for glass material referred to as embodiment 1 of the present invention.

After setting a pair of press dies 5 and 6 onto a press machine as shown in FIG. 2, a raw material preheated up to 600° C. whose composition comprises $SiO_2$ 68 wt %, $K_2O$ 8 wt %, $B_2O_3$ 11 wt %, BaO 2 wt %, and $Na_2O_3$ 11 wt %, which is in the form of a glass circular disk (a circular disk form with a 95.0 mm diameter, 1.21 mm thickness, and a circular hole with a 25.0 mm diameter located at the center area) 7, is disposed between the pair of dies which are heated up to 700° C. followed by holding them for 2 minutes so that the clearance becomes 1.20 mm between the pair of dies located at the upper and lower positions under a pressure of 2 $kgcm^{-2}$, cooling for 10 minutes down to 450° C. with the circular disk form holding the glass material between the dies, and removing the glass disk after forming.

In FIG. 2, numerals 8 and 9 are heating heaters for press dies 5 and 6, numeral 10 is a supply jig for raw material glass circular disks, numeral 11 is a piston cylinder for the upper die, numeral 101 is a piston cylinder for the lower die, numeral 102 is a preheating tunnel furnace for raw material glass circular disks, and numeral 103 is the exit for formed disks. In this manner, a doughnut-shaped glass disk substrate 1 was made which has a hole for mounting a rotating shaft in its center.

Referring again to FIG. 1, oxides comprising Co ferrite film 3 of a magnetic thin film for a magnetic recording medium and CoZnFe amorphous oxide film layer 2 of its under layer film were formed as follows by a plasma enhanced MO-CVD method on one surface of the glass disk substrate 1 thus made.

Figure 3:
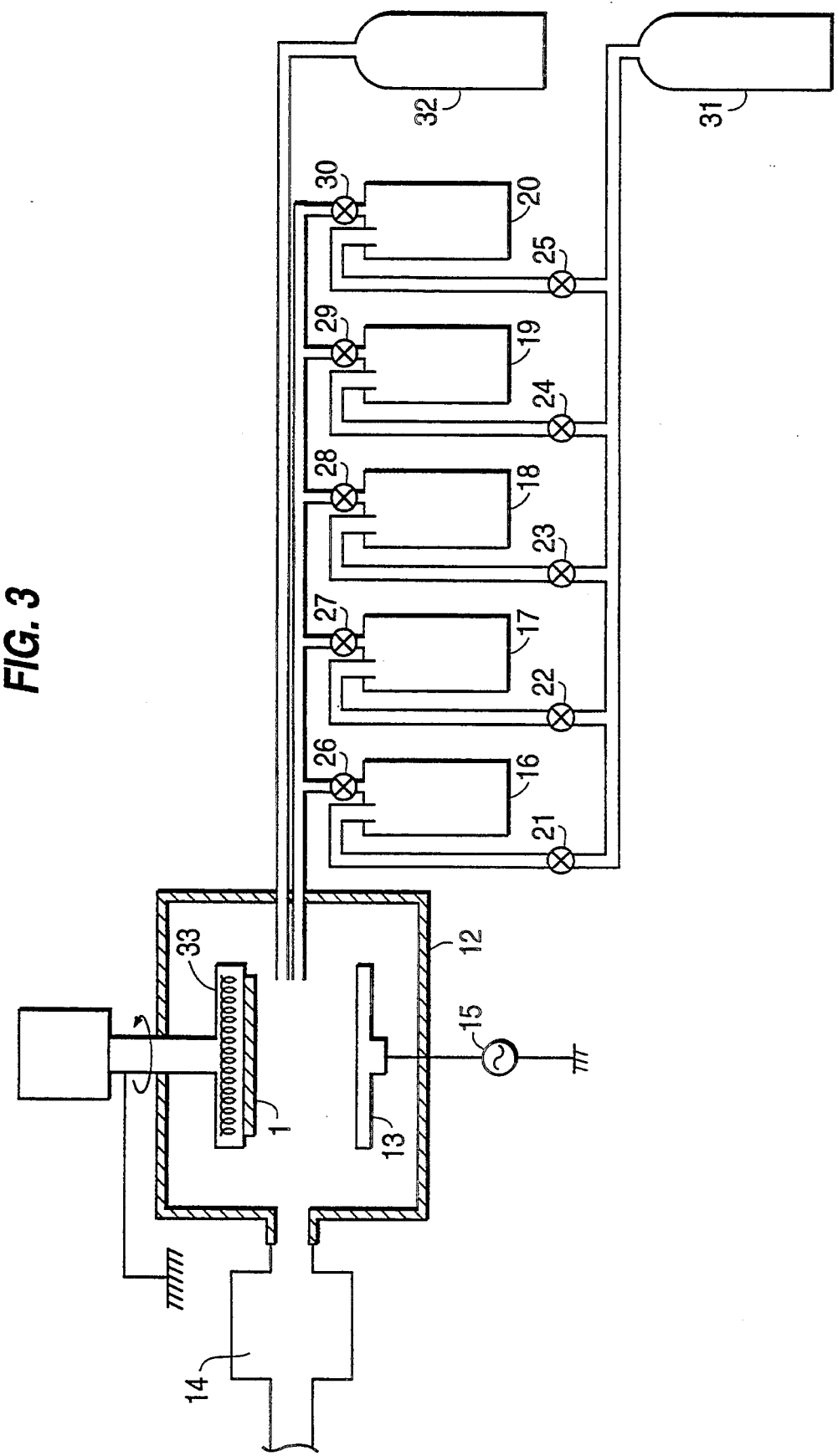
FIG. 3 shows a schematic sectional elevation view of a plasma CVD apparatus used for making a magnetic film and its under layer film referred to as embodiment 1 of the present invention.

FIG. 3 shows a schematic drawing of a plasma CVD apparatus to be used for making a magnetic recording medium in one embodiment of the present invention. In the figure, numeral 12 is a reaction chamber, 13 is an electrode, 14 is an exhausting system for keeping the inside of the reaction chamber at a low pressure, 15 is a high frequency electric source (13.56 Mhz), numerals 16–20 are vaporizers containing raw material therein, numerals 21–25 are first valves for controlling the introduction of carrier gas into the carburetors, numerals 26–30 are second valves for controlling the introduction of raw material gas and carrier gas into the vaporizers, numeral 31 is a raw material gas and carrier gas cylinder (for nitrogen), numeral 32 is a reaction gas cylinder (for oxygen), and numeral 33 is a substrate heater having a substrate rotating mechanism.

Explanation of a production method for a magnetic recording medium of the present invention follows.

Using iron acetylacetonate [$Fe(C_5H_7O_2)_3$], zinc acetylacetonate [$Zn(C_5H_7O_2)_2H_2O$], and cobalt acetylacetonate [$Co(C_5H_7O_2)_3$], as initial raw materials dehydrated zinc acetylacetonate (dehydrated for 2 hours at 100° C. under vacuum atmosphere) is put into a vaporizer 16, cobalt acetylacetonate is put into a vaporizer 17, and iron acetylacetonate put into a vaporizer 18, and said materials are respectively kept at 80° C., 130° C. and 120° C. with heating. By introducing nitrogen carrier vapor (flow volume of 10 SCCM into vaporizers 16, 17 and 18 respectively) along with respective acetylacetonate vapors of aforementioned zinc, cobalt, and iron, and oxygen (flow volume 5 SCCM) through opening the first valves 21–23 and second valves 26–28 into a depressed reaction chamber 12 which is depressed through an exhaust system 14, a plasma is generated (at a power 1.5 W/cm$^2$), and a film of CoZnFe oxide film 2 is formed on a disk 1 consisting of glass and the like heated to 400° C. (120 rpm) following a reaction in a depressed pressure (0.08 Torr) for 2 minutes, and then the first valve 21 and the second valve 26 were closed.

Further following the above, the reaction was continued for 9 minutes under the same film forming conditions at a reduced pressure (0.06 Torr), forming a Co ferrite film 3 on the CoZnFe oxide film 2 and also forming such a 2-layer film of Co ferrite/CoZnFe oxide. By taking out from the reaction chamber 12 a disk substrate 1 which formed its second layer film and forming a 2-layer film of the same structure on the back side in the same manner, followed by making a Co ferrite/CoZnFe oxide disk having a magnetic thin film on both sides. Then, after giving a heat treatment to this disk for 3 hours in the air at 300° C. followed by applying a lubricant layer 4 to the surfaces through immersion in a liquid bath (not illustrated here) which contains fluorescent organic lubricant, the magnetic recording medium of a magnetic rigid disk form was made.

The magnetic recording medium of the present embodiment thus obtained was subjected to evaluation of electromagnetic transfer characteristics with a selected head current value of 50 mA by use of MIG head having a gap length (GL) of 0.25 μm and truck width (Tw) of 10 μm. By rotating the magnetic rigid disk at a speed of 3,600 r.p.m., evaluation was made on a circumferential truck at 20.0 mm from the center of the disk. The relative speed between the magnetic rigid disk and the magnetic head were 7.5/sec and the flying height of the magnetic head was 0.15 μm.

For comparison, a conventional Co-Ni/Cr alloy thin film magnetic recording medium was made of a magnetic rigid disk (magnetized orientation in an inner direction of aluminum substrate) form, on which a similar lubricant layer as that of the present invention was provided by forming a carbon film of 600 Å as a protection layer on a magnetic layer whose film thickness was 800 Å and which consisted of a Co-Ni magnetic layer and Cr layer of Ms=800 emu/cc at Hc=1.0 kOe.

In addition, a magnetic recording medium was made in a magnetic rigid disk form with a Co ferrite thin film without an under layer film (Co ferrite monolayer medium) whose structure is composed of a Co ferrite magnetic film (the forming conditions are the same as those of the 2-layer film) formed directly on a glass disk substrate.

Then, the magnetic transfer characteristic was measured in the same conditions as the magnetic recording medium of the present embodiment.

Figure 4:
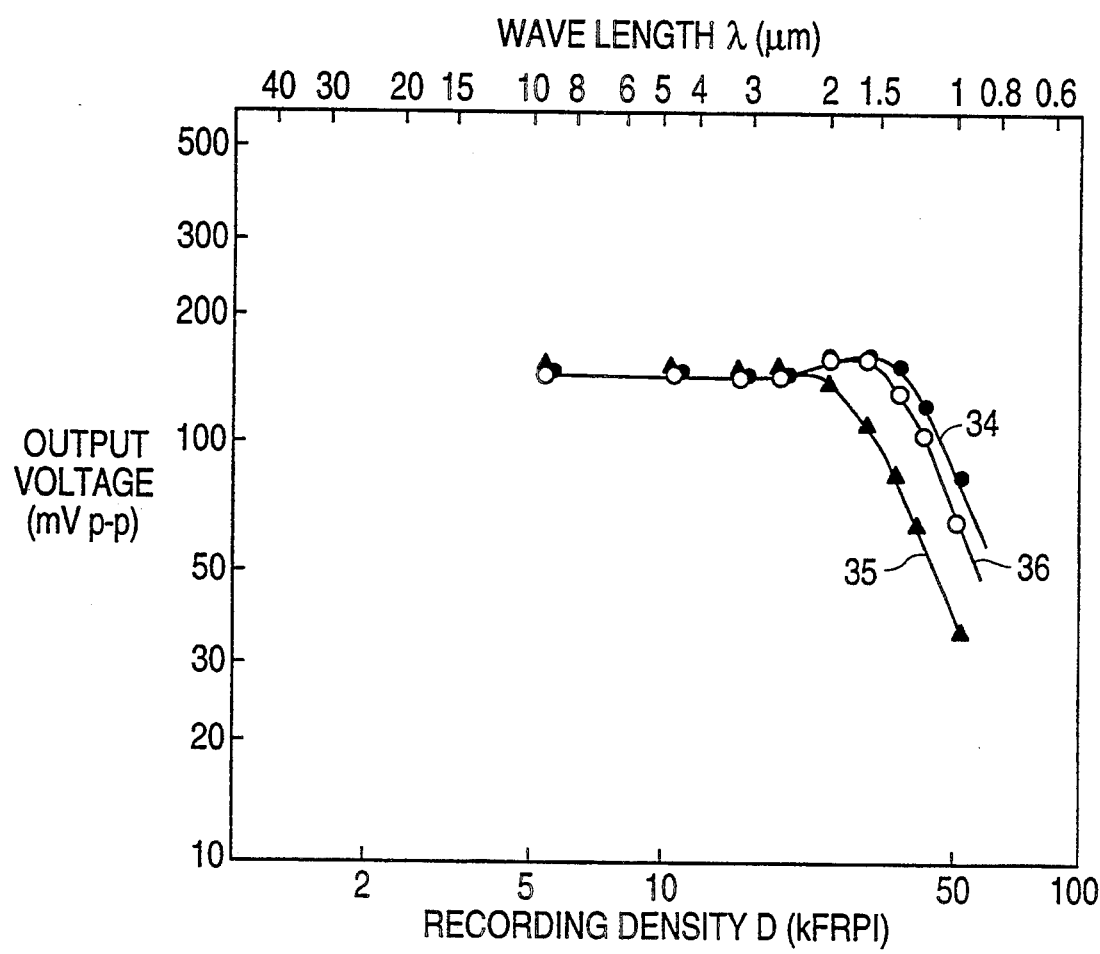
FIG. 4 shows a comparison diagram of the output voltage characteristics made by a magnetic head for a magnetic recording medium referred to as embodiment 1 of the present invention, a medium without an under layer film, and a conventional medium for comparison.

Comparisons were made and shown in FIG. 4 of the relationship between the magnetic recording medium of the present embodiment thus obtained and the conventional Co-Ni/Cr alloy thin film medium, and between the recording density or recording wave length and reproduced output of a Co ferrite monolayer medium.

In FIG. 4, the abscissa represents the recording density or recording wave length, while the ordinate represents the output voltage. Numeral 34 shows the magnetic recording medium of the present embodiment, numeral 35 shows the conventional Co-Ni/Cr alloy thin film medium for comparison purpose, and numeral 36 shows the characteristic of Co ferrite monolayer film medium, respectively.

From FIG. 4, the magnetic recording medium of the present embodiment shows a higher value of output voltage in a high recording density side of a short wave length range than those of the conventional Co-Ni/Cr alloy thin film medium and Co ferrite monolayer medium, which clearly demonstrates that the magnetic recording media of the present embodiment are able to comply with the high recording density.

Also, observing through an oscilloscope a reproduced wave shape of the recording signal at 500 KHz of the magnetic recording medium of the present invention shows that it represents a dipulse wave shape containing a perpendicular magnetic recording component as its character.

After completing the measurement of the electromagnetic transfer characteristic, an analysis of crystal structure was made through X-ray diffraction of Co ferrite/CoZnFe oxide magnetic recording medium, excluding the lubricant layer 4 of a magnetic recording medium of the present embodiment by using an organic solvent.

As a result, it was found that the Co ferrite/CoZnFe oxide magnetic recording medium was composed of a spinel crystal structure and was predominantly orientated to (100).

For comparison purpose, after making a specimen on which film is formed with CoZnFe oxide film 2 alone under the same film forming conditions as the aforementioned embodiment on a glass disk substrate 1 followed by heat-treating it in the air at 300° C. for 3 hours, an analysis of crystal structure was made through the X-ray diffraction method. As a result, it was found in terms of an the X-ray that the CoZnFe oxide film 2 was of an amorphous type.

Furthermore, as a result of observation on a surface and a broken-out section through the use of a high-resolution scanning electron microscope breaking the Co ferrite monolayer medium of the magnetic layer film medium of the present embodiment and the comparison specimen, it was known that the 2-layer film of the magnetic recording medium of the present embodiment has a columnar structure with a columnar diameter of 450–550 Å at film thickness of about 3100 Å, and Co ferrite monolayer film medium has a columnar structure with a columnar diameter of 200–700 Å at film thickness of about 2,500 Å.

Next, the magnetic characteristics of Co ferrite monolayer film medium, CoZnFe oxide film 2 and Co ferrite/CoZnFe oxide magnetic recording medium were measured by a vibrating sample magnetometer (VSM). As a result, the CoZnFe oxide film 2 did not show magnetism, but the magnetic recording medium of Co ferrite/CoZnFe oxide showed excellent squareness compared with the Co ferrite monolayer medium. The coercive force of Co ferrite/CoZnFe oxide magnetic recording medium has Hc (perpendicular)=1200 Oe, Hc (parallel)=780 Oe and Ms was 284 emu/cc.

The reason why the magnetic recording medium of the present embodiment shows higher output voltage in a high recording density of a short wave region than that in the Co ferrite monolayer medium is considered to be that the distribution of columnar diameter becomes smaller compared with the case of Co ferrite monolayer by use of amorphous CoZnFe oxide film as an under layer film, and as a result, squareness of the Co ferrite/CoZnFe oxide magnetic recording medium has improved.

And, as a result of the same investigation made on an oxide which contains at least any one element among the elements of magnesium, calcium, titan, vanadium, manganese, iron, cobalt, nickel, copper, zinc, strontium, niobium, cadmium, and barium, a thin film layer which is evaluated as an amorphous material by an X-ray diffraction method yielded the same result as the case of the CoZnFe oxide film 8.

In this manner, according to the aforementioned embodiment, as the amorphous CoZnFe oxide film 2 is formed on a glass disk substrate 1 and the Co ferrite film 3 is formed thereon, a magnetic recording medium can be produced which has excellent reliability in endurance and hardness and also renders high density magnetic recording. Furthermore, even when the disk substrate was of a generally produced glass disk substrate, the same result as aforementioned case was naturally obtained.

Embodiment 2

Figure 5:
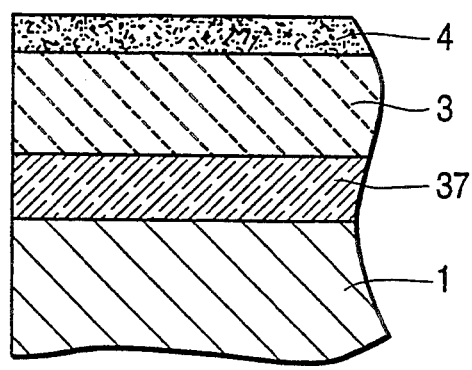
FIG. 5 shows an enlarged sectional view of the main area of the magnetic recording medium of a magnetic rigid disk form referred to as embodiment 2 of the present invention.

FIG. 5 shows a structure of a magnetic recording medium of a magnetic rigid disk form in the second embodiment of the present invention. In this figure, numeral 1 represents a glass disk substrate, numeral 37 represents NiO under layer film, and 3 represents Co ferrite film, and numeral 4 represents a lubricant layer.

First, in the same manner as in embodiment 1, a glass disk substrate 1 was made. By using the same device as in embodiment 1, the Co ferrite film 3 and NiO under layer film 2 of a magnetic recording medium thin film were formed on the surface of glass substrate 1 as mentioned below.

As initial materials, iron acetylacetonate [Fe(C$_5$H$_7$O$_2$)$_3$], nickel acetylacetonate [Ni(C$_5$H$_7$O$_2$)$_2$H$_2$O], and cobalt acetylacetonate [Co(C$_5$H$_7$O$_2$)$_3$] were used.

Dehydrated Ni acetylacetonate (dehydrated for 2 hours at 100° C. under vacuum atmosphere) was put into a vaporizer 16, cobalt acetylacetonate was put into a vaporizer 17, and iron acetylacetonate was put into a vaporizer 18, and said materials were respectively kept at 180° C., 130° C. and 120° C. with heating. By introducing nitrogen carrier vapor (flow volume of 30 SCCM) along with the nickel acetylacetonate vapor and oxygen (flow volume of 5 SCCM) into a depressed reaction chamber 12 through an exhaust system 14 with valves 21 and 26 opened, plasma was generated (at power 1.5 W/cm$^2$) and a NiO film was formed on a glass disk substrate (120 rpm) heated at 400° C. following a reaction at a depressed pressure (0.08 Torr) for 5 minutes, and then valve 21 and second valve 26 were closed.

By opening valves 22, 23, 27, and 28 within this vacuum condition and then introducing carrier gas (flow rate at 3 SCCM in a vaporizer side 17 and at 8 SCCM in a vaporizer side 18) along with vapors of cobalt acetylacetonate and iron acetylacetonate into a reaction chamber 12, a 2-layer film consisting of Co ferrite/NiO was formed by forming the Co ferrite film 3 on the NiO film 37 through a reaction in a plasma (electric power 1.5 W/cm$^2$) for 10 minutes under depressed condition (0.06 Torr).

Next, by taking out the glass disk substrate 1 forming a 2-layer film from the vacuum chamber and also forming the same 2-layer film on the back side in the same manner, a Co ferrite/NiO disk having a magnetic thin film on both sides was made.

After heat-treating this disk for 3 hours in a 300° C. air atmosphere, a magnetic recording medium of a magnetic rigid disk form was made and immersed in a liquid tank containing a fluorine-contained organic lubricant.

The magnetic recording medium thus obtained was evaluated for electromagnetic transfer characteristics through use of the same magnetic head as used in embodiment 1 and in the same manner. For comparison purposes, the same 2 media as used in the embodiment 1 were also employed here.

Figure 6:
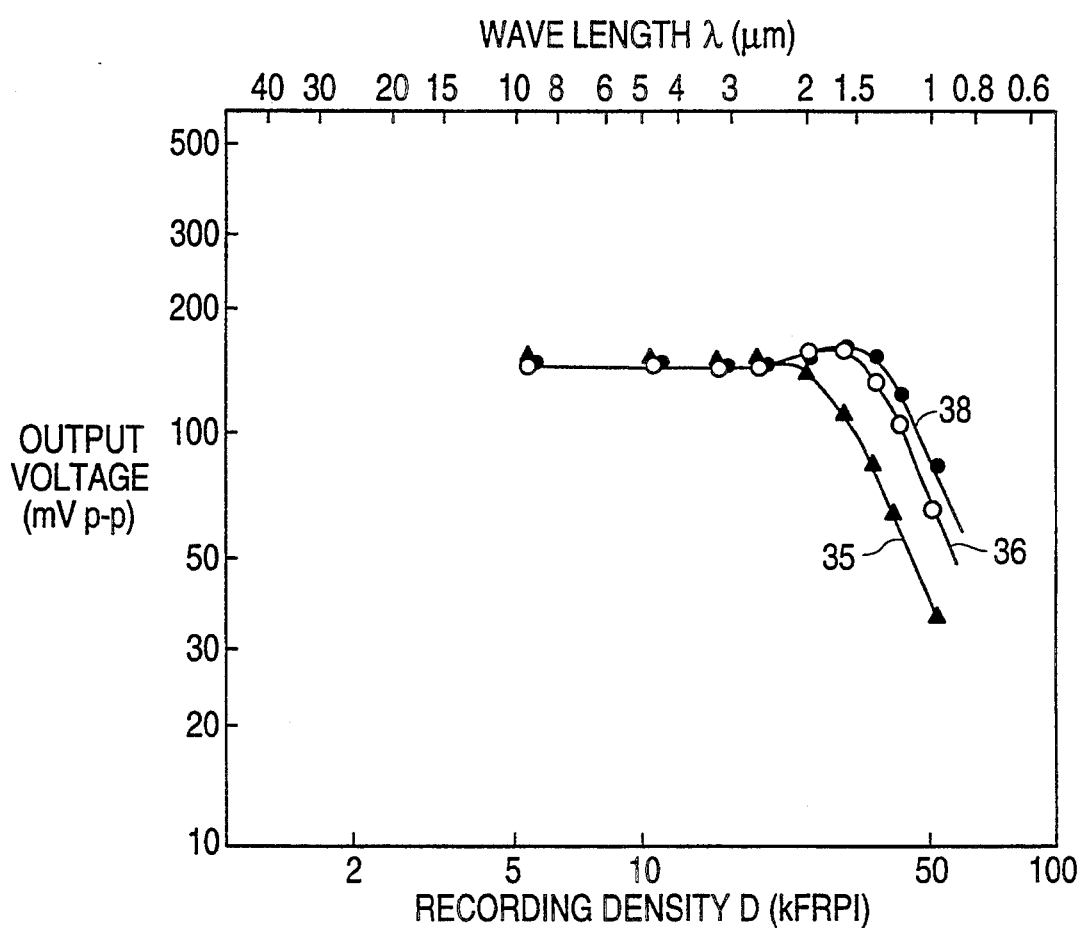
FIG. 6 shows a comparison diagram of the output voltage characteristics made by a magnetic head for a magnetic recording medium referred to as embodiment 2 of the present invention, a medium without an under layer film, and a conventional medium for comparison.

A relationship between recording density and output voltage of the magnetic recording medium of the present invention thus obtained, Co-Ni/Cr alloy thin film medium and Co ferrite monolayer film medium is shown in FIG. 6.

In FIG. 6, the abscissa represents the recording density (recording wave length) while the ordinate represents the output voltage. Numeral 38 represents the characteristic of the magnetic recording medium of the present invention, numeral 35 represents that of a Co-Ni/Cr alloy thin film medium for comparison, and numeral 36 represents that of Co ferrite monolayer film medium for comparison.

In FIG. 6, it is clear that magnetic recording medium of the present invention shows higher values of output voltage than the conventional Co-Ni/Cr alloy thin film medium and Co ferrite monolayer film medium in a high recording density side of short wave length range. It was found that the magnetic recording medium of the present invention is able to comply with higher recording density. In addition, observation of an output voltage wave form at 500 KHz of recording signals of the magnetic recording medium of the present invention through an oscilloscope showed a dipulse wave form which contains a perpendicular magnetic recording component as its character.

After completing measurement of the electromagnetic transfer characteristic, an analysis of crystal structure through an X-ray diffraction was carried out on the Co ferrite/NiO magnetic recording medium using an organic solvent and also without a lubricant film layer.

In addition, for comparison, an analysis of crystal structure through X-ray diffraction was carried out by making a specimen formed of a NiO film 38 only on a glass disk substrate 1 under the aforementioned conditions and in the same manner as a specimen formed of a Co ferrite film 3 on a glass disk substrate under the aforementioned conditions.

As a result, the NiO film 38 formed under the aforementioned conditions was completely oriented to (100) in terms of X-ray.

Besides, by using the (100) completely oriented film of NiO as its under layer, the (100) orientation of the Co ferrite film as a magnetic layer was improved compared with the case in which the film was formed directly on the glass disk being subjected to the influence of crystal orientation of the under layer.

In addition, observation was made on the surface and a broken section of the disk through a high-resolution scanning electron microscope by breaking the Co ferrite/NiO magnetic recording medium. As a result, it has become clear that a 2-layer film of the magnetic recording medium showed a columnar structure with a columnar diameter of 400–800 Å at a film thickness of about 4,500 Å. As a result of observation of NiO film 38 and Co ferrite film 3 in the same manner through the scanning electron microscope, the film thickness of NiO film was determined to be about 2,000 Å and that of Co ferrite film was determined to be about 2,500 Å.

Furthermore, analysis of the composition of the Co ferrite/NiO magnetic recording medium through an X-ray microanalyzer revealed that Co/Fe=5/95.

In addition, measurement was made for magnetic characteristic of the Co ferrite/NiO magnetic recording medium by a vibrating sample magnetometer (VSM). As a result, the coercive force of the magnetic recording medium were Hc (perpendicular)=1,200 Oe and Hc (parallel)=780 Oe. Further, the Ms of the Co ferrite/NiO 2-layer film was 275 emu/cc.

The reason why the magnetic recording medium of the present invention shows higher output voltage in a high recording density side of a shorter wave length range than the Co ferrite monolayer medium is thought to be that the use of NiO film 38 of (100) orientation as an under layer increased the (100) orientation of the Co ferrite film 3.

In this connection, it became clear that the under layer film became the magnetic recording medium having the same characteristic as the aforementioned, not only when it was used with NiO, but also when it was with CoO and MnO.

Embodiment 3

Figure 7:
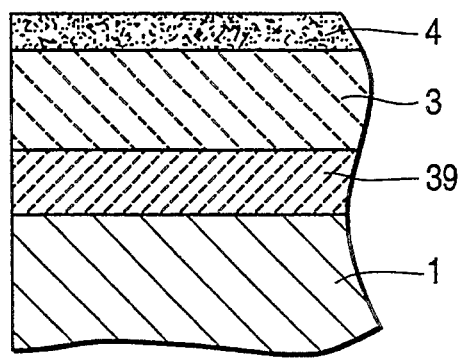
FIG. 7 shows an enlarged sectional view of the main area of the magnetic recording medium of a magnetic rigid disk form referred to as embodiment 3 of the present invention.

FIG. 7 shows a structure of magnetic recording medium of a magnetic rigid disk form of the present embodiment of the present invention. In this figure, numeral 1 represent a glass disk substrate, numeral 39 represents Mn-Zn ferrite thin layer film, numeral 3 represents Co ferrite film, and numeral 4 represents a lubricant layer.

First of all, in the same manner as in the embodiment 1, a glass disk substrate 1 was made. By using the same device as in the embodiment 1, on the surface of this glass substrate 1 the Co ferrite film 3 and Mn-Zn ferrite thin film layer 39 were formed.

An explanation follows of a production method for a magnetic rigid disk of the third embodiment with reference to FIG. 2.

Iron acetylacetonate $[Fe(C_5H_7O_2)_3]$, manganese acetylacetonate $[Mn(C_5H_7O_2)_2H_2O]$, zinc acetylacetonate $[Zn(C_5H_7O_2)_2H_2O]$ and cobalt acetylacetonate $[Co(C_5H_7O_2)_3]$ were used as initial materials along with dehydrated manganese acetylacetonate (for 2 hours at 100° C. under vacuum atmosphere) in a vaporizer 16, dehydrated zinc acetylacetonate in a vaporizer 17 (for 2 hours at 100° C. under vacuum atmosphere), cobalt acetylacetonate in a vaporizer 18, and iron acetylacetonate in a vaporizer 19, wherein the materials contained in the vaporizers are respectively kept at 180° C., 70° C., 120° C. and 135° C. with heating.

Opening the 1st valves 16, 17, and 19 and the 2nd valves 26, 27, and 29, and then by introducing nitrogen carrier gas (flow volume of 4 SCCM into the vaporizer 16 side, 7 SCCM into vaporizer 17 side, and 15 SCCM into the vaporizer 19 side) along with the manganese acetylacetonate vapor, zinc acetylacetonate vapor, and iron acetylacetonate vapor together with oxygen (flow volume of 5 SCCM) as a reaction gas into a depressed reaction chamber 12 through an exhaust system 14, plasma is generated (at power 1.5 W/cm$^2$) and a Mn-Zn ferrite film 39 is formed on a glass disk substrate 1 (120 rpm) heated at 400° C. following a reaction in a depressed pressure (0.09 Torr) for 6 minutes, and then the first valve 16 and 17 and second valve 26 and 27 were closed.

Further, following this, by opening the 1st valve 18 and the 2nd valve 28 within this vacuum condition, and then introducing nitrogen carrier gas (flow rate at 8 SCCM) along with vapors of cobalt acetylacetonate and iron acetylacetonate into a reaction chamber 12, a 2-layer film consisting of Co ferrite/Mn-Zn ferrite is formed by forming the Co ferrite film 3 on the Mn-Zn ferrite film 39 through a reaction in a plasma (electric power 1.5 W/cm$^2$) for 8 minutes under a depressed condition (0.07 Torr).

Then, taking out a disk substrate 1 forming a 2-layer film from a reaction chamber 12 and also forming the same 2-layer film on the back side in the same manner, a Co ferrite/Mn-Zn ferrite disk having a magnetic thin film on both sides was made.

After heat-treating this disk for 3 hours in a 300° C. air atmosphere, a magnetic recording medium of a magnetic rigid disk form was made by forming a lubricant layer 4 through immersion in a liquid tank containing a fluorine-contained organic lubricant (not illustrated here).

The magnetic recording medium thus obtained was evaluated for electromagnetic transfer characteristics through use of the same magnetic head as used in the embodiment 1 and in the same manner. For a comparison purpose, the same two media used in embodiment 1 were also employed here.

Figure 8:
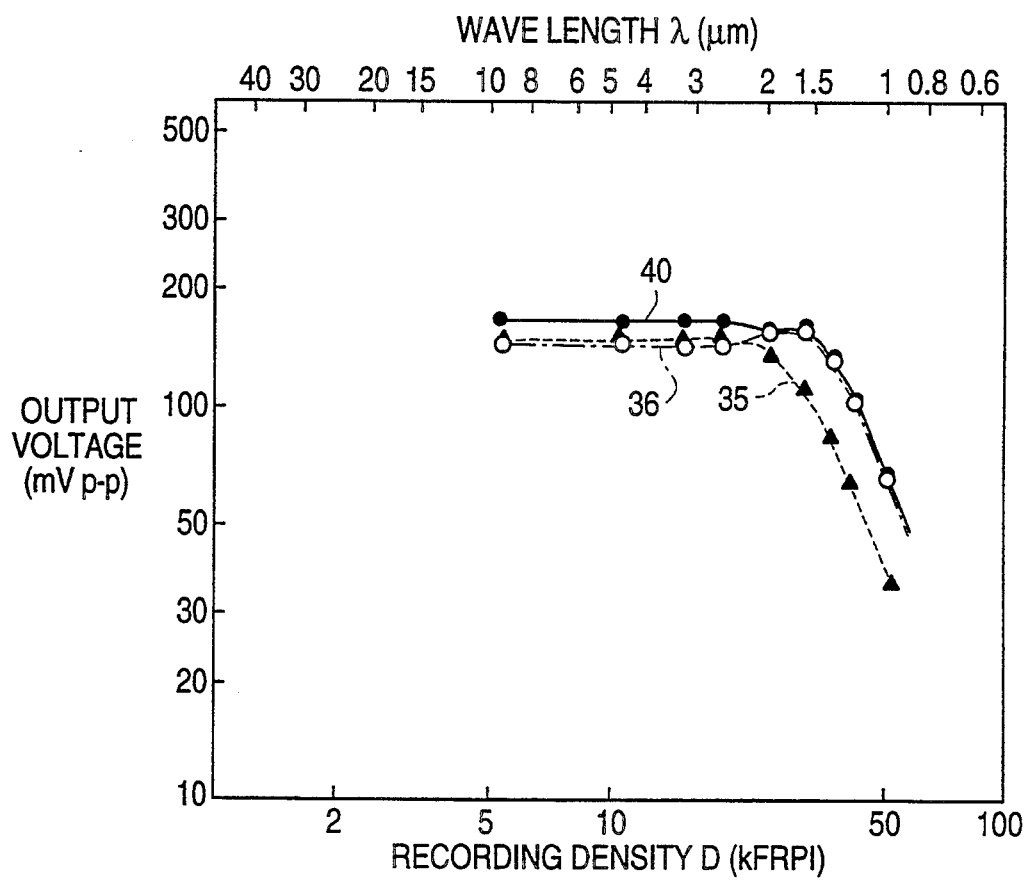
FIG. 8 shows a comparison diagram of the output voltage characteristics made by a magnetic head for a magnetic recording medium referred to as embodiment 3 of the present invention, a medium without an under layer film, and a conventional medium for comparison.

A relationship between recording density or recording wave length and output voltage of the magnetic recording medium of the present embodiment thus obtained, Co-Ni/Cr alloy thin film medium and Co ferrite monolayer film medium is shown in FIG. 8.

In FIG. 8, the abscissa represents the recording density or recording wave length while the ordinate represents the output voltage. In the figure, numeral 40 represents the characteristic of the magnetic recording medium of the present embodiment, numeral 35 represents that of conventional of Co-Ni/Cr alloy thin film medium for comparison, and numeral 36 represents that of conventional Co ferrite monolayer film medium for comparison, respectively.

From FIG. 8, it became clear that a magnetic recording medium of the present embodiment shows higher values of output voltage than the conventional Co-Ni/Cr alloy thin film medium when compared, and in general the output voltage is higher than the conventional Co ferrite monolayer medium when compared, showing that the magnetic recording medium of the present invention is able to comply with higher recording density.

In addition, observation of an output voltage wave form at 500 KHz of recording signals of the magnetic recording medium of the present embodiment through an oscilloscope showed a dipulse wave form which contains a perpendicular magnetic recording component as its character.

After completing measurement of electromagnetic transfer characteristic, an analysis of crystal structure through X-ray diffraction was carried out on Co ferrite/Mn-Zn ferrite 2-layer film by using an organic solvent and then removing the lubricant film layer of the magnetic recording medium of the present embodiment, and as a result, it became clear that the generated film consisted of a spinel crystal structure with a predominant orientation of (100).

In addition, observation was made on the surface and a broken section of the disk through a high-resolution scanning electron microscope (SEM) by breaking magnetic recording medium of the present embodiment. As a result, it has become clear that the 2-layer film showed a columnar structure with a columnar diameter of 450–800 Å at a film thickness of about 3,500 Å. Besides, as a result of forming Mn-Zn ferrite film 39 and Co ferrite film 3 on the glass disk substrate 1 for comparison and observing in the same manner through the SEM, the film thickness of Mn-Zn ferrite film was determined to be about 1,500 Å and that of Co ferrite film 3 was determined to be about 2,000 Å. Furthermore, analysis of composition of the Mn-Zn ferrite film 39 and Co ferrite film 3 through an electron beam micro-analyzer (EPMA) revealed that Mn/Zn/Fe=7/3/20 and Co/Fe=1/19.

In addition, measurement was made for the magnetic characteristics of the Mn-Zn ferrite film 39 and Co ferrite film 3 by a vibrating sample magnetometer (VSM). The characteristics of the Mn-Zn ferrite film were Hc=450 Oe and Ms=325 emu/cc and the Co ferrite film were Hc=1,200 Oe and Ms=260 emu/cc.

The reason why the magnetic recording medium of the present embodiment shows higher output voltage in a high recording density of short wave length range than the conventional Co-Ni/Cr alloy thin film medium is thought to be that it contains a perpendicular magnetic recording component, and the reason why it shows higher output voltage than a Co ferrite monolayer medium is that the use of a soft magnetic material as an under layer decreases the influence of the reversing magnetic field due to generation of a horseshoe magnetic circuit with the Co ferrite magnetic layer.

According to the aforementioned embodiment, as a Mn-Zn ferrite film 39 is formed on a disk substrate 1 and a cobalt ferrite film 3 is further formed thereon, a magnetic recording medium can be produced which is capable of high density magnetic recording with excellent reliability for endurance and hardness.

Using the same film forming method as other embodiments of the present invention and forming films of Ni-Zn ferrite, Mn ferrite, Ni ferrite or Zn ferrite as an under layer respectively, and then making a magnetic recording medium of a magnetic rigid disk form with a 2-layer film of Co ferrite/Ni-Zn ferrite, Co ferrite/Mn ferrite, Co ferrite/Ni ferrite or Co ferrite/Zn ferrite, evaluation of the electromagnetic transfer characteristic was carried out.

As a result, in the same case as the magnetic recording medium which consists of a 2-layer film of Co ferrite/Mn-Zn ferrite, a higher output voltage value was shown in a high recording density side of short wave length compared with the conventional Co-Ni/Cr alloy thin film medium, and a higher output value was shown in general when compared with Co ferrite monolayer medium.

Embodiment 4

Figure 9:
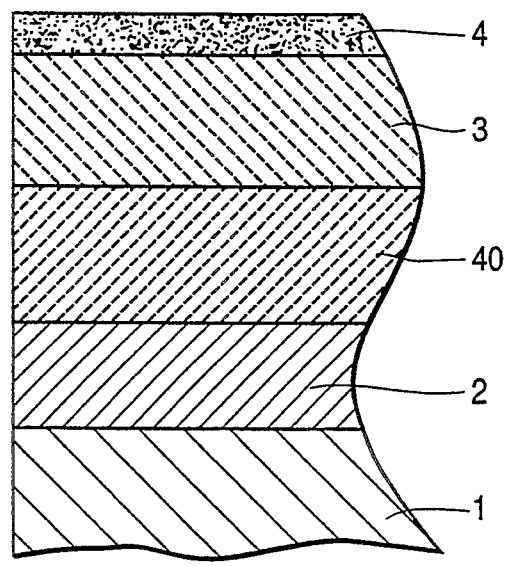
FIG. 9 shows an enlarged sectional view of the main area of the magnetic recording medium of a magnetic rigid disk form referred to as embodiment 4 of the present invention.

FIG. 9 shows a structure of a magnetic recording medium of a magnetic rigid disk form of the present embodiment. In this figure, numeral 1 represents a glass disk substrate, numeral 2 represents CoZnFe amorphous oxide thin layer film, numeral 40 represents Mn-Zn ferrite thin layer film, numeral 3 represents Co ferrite film, and numeral 4 represents a lubricant layer.

First of all, in the same manner as in embodiment 1, a glass disk substrate 1 was made. By using the same device as in embodiment 1, to the surface of this glass disk substrate the Co ferrite film 3, Mn-Zn ferrite film 40, and CoZnFe amorphous oxide thin film 2 were formed.

An explanation follows of a production method for a magnetic rigid disk of the present embodiment.

Iron acetylacetonate [Fe(C$_5$H$_7$O$_2$)$_3$], manganese acetylacetonate [Mn(C$_5$H$_7$O$_2$)$_2$H$_2$O], zinc acetylacetonate [Zn(C$_5$H$_7$O$_2$)$_2$H$_2$O] and cobalt acetylacetonate [Co(C$_5$H$_7$O$_2$)$_3$] were used as initial materials along with dehydrated zinc acetylacetone (for 2 hours at 100° C. under vacuum atmosphere) in a vaporizer 16, dehydrated manganese acetylacetonate in a vaporizer 17 (left for 2 hours at 100° C. under vacuum atmosphere), cobalt acetylacetonate in a vaporizer 18, and iron acetylacetonate in a vaporizer 19, and the materials contained in the vaporizers were respectively kept at 75° C., 180° C., 120° C., and 135° C. with heating.

Opening the 1st valves 21, 23, and 24 and the 2nd valves 26, 28 and 29 and then introducing into a depressed reaction chamber 12 through an exhaust system 14 a nitrogen carrier gas (flow volume of 10 SCCM, respectively) along with acetylacetonate vapor respectively of said zinc, cobalt, and iron together with oxygen (flow volume of 2 SCCM) as a reaction gas, plasma is generated (at power 1.5 W/cm$^2$) and a CoZnFe oxide film 2 is formed on a glass disk substrate 1 (120 rpm) heated at 400° C. following a reaction at a depressed pressure (0.10 Torr) for 2 minutes, and then the first valve 23 and second valve 28 were closed.

Following this, by opening the 1st valve 21 and the 2nd valve 26, and then introducing a reaction chamber 12 depressed by an exhaust system 14 a nitrogen carrier gas (flow rate at 10 SCCM respectively to vaporizers 16, 17 and 19) along with vapors of zinc acetylacetonate, manganese acetylacetonate and iron acetylacetonate together with oxygen (flow rate 5 SCCM) as a reactive gas, plasma is generated (electric power 1.5 W/cm$^2$) for 5 minutes under low pressure (0.09 Torr) and a Mn-Zn ferrite film 39 is formed on a disk substrate 1 (120 rpm) with heating at 400° C., and then the 1st valves 21 and 22 and the 2nd valves 26 and 27 are closed.

Further, by opening the 1st valve 23 and the 2nd valve 28, then allowing nitrogen carrier gas (flow rate at 10 SCCM into vaporizers 18 and 19 respectively) along with vapors of cobalt acetylacetonate and iron acetylacetonate together with oxygen (flow rate at 5 SCCM) as a reactive gas to react in a plasma (electric power 1.5 W/cm$^2$) for 8 minutes under low pressure (0.07 Torr), a 3-layer film consisting of Co ferrite/Mn-Zn ferrite film/CoZnFe oxide was formed by putting a Co ferrite film 3 on the Mn-Zn ferrite film 39.

Then, taking out the glass disk substrate 1 forming a 3-layer film from reaction chamber 12 and also forming the same 3-layer film on the back side in the same manner, a Co ferrite/Mn-Zn ferrite/CoZnFe oxide disk having a magnetic thin film on both sides was made.

After heat-treating this disk for 3 hours in a 300° C. air atmosphere, a magnetic recording medium of a magnetic rigid disk form was made by forming a lubricant layer 4 through immersion in a liquid tank (not illustrated here) containing a fluorine-contained organic lubricant.

The magnetic recording medium thus obtained was evaluated for electromagnetic transfer characteristics through use of the same magnetic head as used in the embodiment 1 and in the same manner. For comparison purposes, the same two media as used in embodiment 1 were also employed here.

Figure 10:
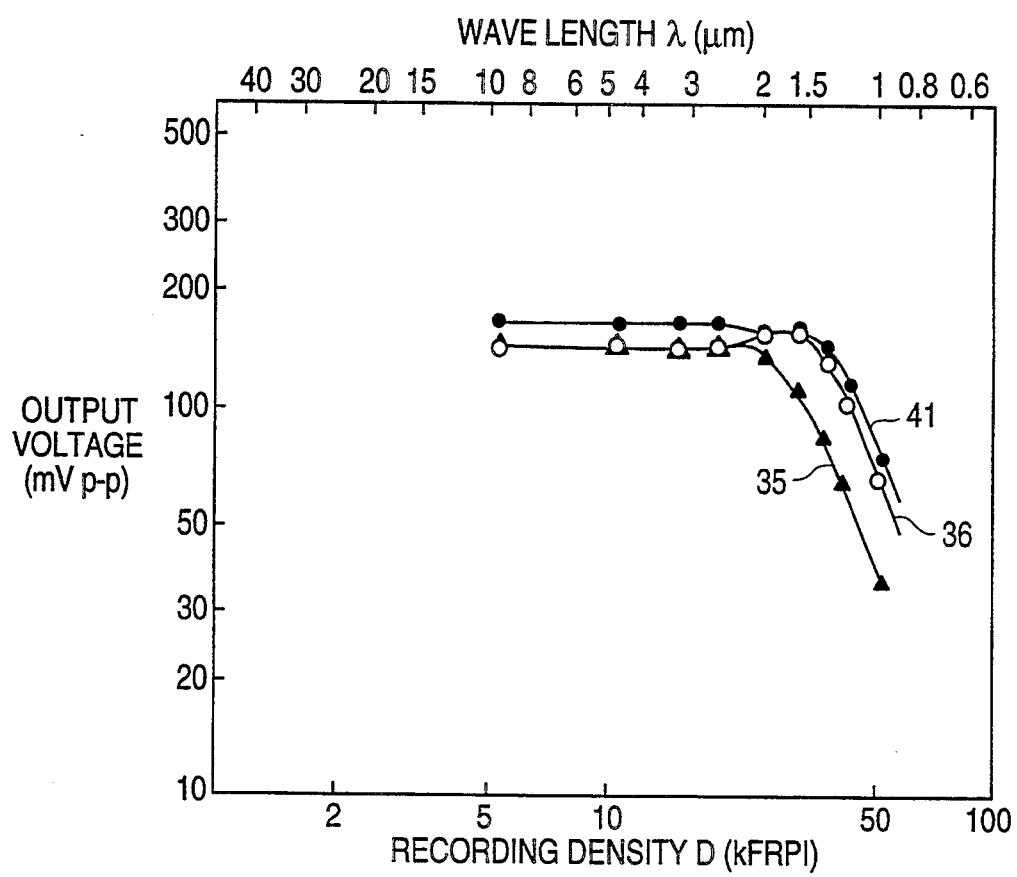
FIG. 10 shows a comparison diagram of the output voltage characteristics made by a magnetic head for a magnetic recording medium referred to as embodiment 4 of the present invention, a medium without an under layer film, and a conventional medium for comparison.

A relationship between output voltage and recording density or recording wave length of the respective media is shown in FIG. 10 for comparison.

In FIG. 10, numeral 41 represents the characteristics of the magnetic recording medium of the present embodiment, numeral 35 represents those of conventional Co-Ni/Cr alloy thin film medium for comparison, and numeral 36 likewise represents those of other conventional Co ferrite monolayer medium.

In FIG. 10, it is clear that the magnetic recording medium of the present embodiment shows higher values of output voltage in general than the conventional Co-Ni/Cr alloy thin film medium by comparison, and it was found that the magnetic recording medium was able to comply with higher recording density.

Besides, observation of an output voltage wave form at 500 KHz of recording signals for the magnetic recording medium of the present embodiment through an oscilloscope showed a dipulse wave form which contains a perpendicular magnetic recording component as its character.

After completing measurement of the electromagnetic transfer characteristic, by making a 2-layer film respectively consisting of CoZnFe oxide film 2, Co ferrite film 3, Mn-Zn ferrite film 39 or Mn-Zn ferrite/Co ferrite in the same condition as in the aforementioned embodiment on a glass disk substrate 1 for comparison, an analysis was carried out with a magnetic recording medium which consists of a 3-layer film of Co ferrite/Mn-Zn ferrite/CoZnFe oxide.

First of all as a result of an analysis made of a crystal structure of the CoZnFe oxide film used as an under layer through an X-ray diffraction method, the CoZnFe oxide film 2 made under the aforementioned conditions was amorphous in terms of an X-ray.

In addition, observation was made on the surface and a broken section of the magnetic rigid disk through a high-resolution scanning electron microscope (SEM) by breaking a magnetic recording medium consisting of a 3-layer film of Co ferrite/Mn-Zn ferrite/CoZnFe oxide. As a result, it has become clear that this 3-layer film showed a columnar structure with a columnar diameter of 500–600 Å at a film thickness of about 4,100 Å.

As a result of observation of a 2-layer film of Co ferrite/Mn-Zn ferrite through the SEM, the film thickness was about 3,500 Å, which shows its columnar growth and the columnar diameter was 450–800 Å. It can be seen that forming an amorphous CoZnFe oxide film 2 as an under layer film makes the average columnar diameter of a magnetic layer which consists of the Co ferrite film 3 smaller as well as its size distribution smaller.

Furthermore, analysis of composition of the Mn-Zn ferrite film 39 and Co ferrite film 3 through an electron beam micro-analyzer (EPMA) revealed that Mn/Zn/Fe=7/3/20, and Co/Fe=1/19 were respectively found.

In addition, measurement was made for the magnetic characteristics of a 2-layer film of Mn-Zn ferrite film/CoZnFe oxide film and Co ferrite film 3 by a vibrating sample magnetometer (VSM). As a result, the characteristics of the 2-layer film of Mn-Zn ferrite film/CoZnFe oxide were; Hc=20 Oe, Ms=320 emu/cc, and the characteristics of the Co ferrite film 3 were Hc=1,200 Oe and Ms=274 emu/cc.

The reason why the magnetic recording medium of the present embodiment shows a higher output voltage in a high recording density side of short wave length region than the Co-Ni/Cr alloy thin film medium is thought to be that it contains a perpendicular magnetic recording component, and also the reason why it shows higher output voltage than Co ferrite monolayer medium is that use of a soft magnetic material of Mn-Zn ferrite film 39 decreased the influence of reversing magnetic field due to generation of a horseshoe magnetic circuit with the Co ferrite magnetic layer.

According to the aforementioned embodiment, by forming an amorphous CoZnFe oxide film 2 on the disk substrate 1 and also the Mn-Zn ferrite film 39 thereon, the Co ferrite layer 3 forms a columnar structure thereon in a perpendicular direction to the surface of disk substrate 1; therefore, a magnetic rigid disk having the ability to carry out high density magnetic recording can be produced with excellent reliability for endurance and hardness.

Besides, as a result of the same investigation about the oxide which contains various elements as in the embodiment 1, as an amorphous oxide thin film, and also about various ferrites produced in the same manner as in embodiment 3, as a soft magnetic iron oxide thin film, in the same case as the magnetic recording medium consisting of a 3-layer film of Co ferrite/Mn-Zn ferrite/CoZnFe oxide of the present embodiment, a higher value of output voltage was shown in general compared with the conventional Co-Ni/Cr alloy thin film medium and Co ferrite monolayer medium.

Embodiment 5

Figure 11:
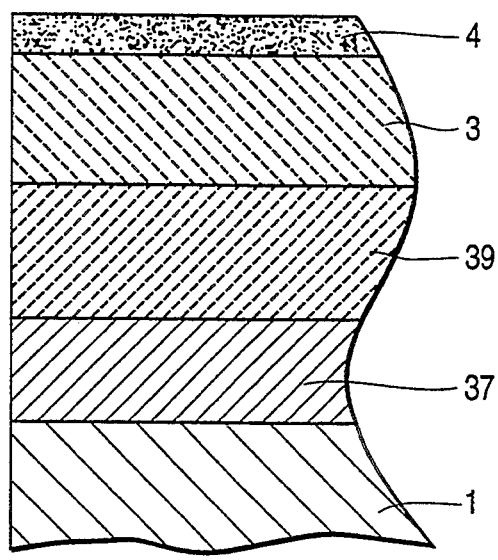
FIG. 11 shows an enlarged sectional view of the main area of the magnetic recording medium of a magnetic rigid disk form referred to as embodiment 5 of the present invention.

FIG. 11 shows a structure of a magnetic recording medium of a magnetic rigid disk form of the present embodiment of the present invention. In this figure, numeral 1 represents a glass disk substrate, numeral 37 represents a NiO thin film layer, numeral 39 represents a Mn-Zn ferrite thin film layer, numeral 3 represents a Co ferrite film, and numeral 4 represents a lubricant layer.

First of all, a glass disk substrate 1 was made in the same manner as in embodiment 1. By using the same device as used in embodiment 1, the Co ferrite film 3, Mn-Zn ferrite film 39, and NiO thin film 37 were formed on the glass substrate 1.

An explanation follows of a production method on a magnetic rigid disk of the present embodiment with reference to FIG. 2.

Iron acetylacetonate [$Fe(C_5H_7O_2)_3$], manganese acetylacetonate [$Mn(C_5H_7O_2)_2H_2O$], zinc acetylacetonate [$Zn(C_5H_7O_2)_2H_2O$] and nickel acetylacetonate [$Ni(C_5H_7O_2)_2H_2O$] and cobalt acetylacetonate [$Co(C_5H_7O_2)_3$] were used as initial materials along with dehydrated nickel acetylacetonate (for 2 hours at 100° C. under vacuum atmosphere) in a vaporizer 16, dehydrated manganese acetylacetonate in a vaporizer 17 (for 2 hours at 100° C. under vacuum atmosphere), zinc acetylacetonate in a vaporizer 18 (for 2 hours at 100° C. under vacuum atmosphere), cobalt acetylacetonate in a vaporizer 19, and iron acetylacetonate in a vaporizer 20, wherein the materials contained in the vaporizers are respectively kept at 170° C., 180° C., 70° C., 120° C., and 135° C. with heating.

Opening the 1st valve 21 and the 2nd valve 26, and then introducing into a depressed reaction chamber 12 through an exhaust system 12 a nitrogen carrier gas (flow volume of 20 SCCM) along with nickel acetylacetonate vapor together with oxygen (flow volume of 3 SCCM) as a reaction gas, plasma is generated (at power 1.5 W/cm$^2$) and a NiO film 37 is formed on a glass disk substrate 1 (120 rpm) heated at 400° C. following a reaction at a depressed pressure (0.10 Torr) for 4 minutes, and then the first valve 21 and second valve 26 were closed.

Following this, by opening the 1st valves 22, 23, and 25, and the 2nd valves 27, 28 and 30 in a vacuum atmosphere, and then introducing into a reaction chamber 12 depressurized by an exhaust system 14 nitrogen a carrier gas (flow rate at 4 SCCM to vaporizer 17, flow rate at 7 SCCM to vaporizer 18, and flow rate at 15 SCCM to vaporizer 20), along with vapors of manganese acetylacetonate, zinc acetylacetonate and iron acetylacetonate together with oxygen (flow rate 5 SCCM) as a reactive gas, plasma is generated (electric power 1.5 W/cm$^2$) for 6 minutes under a depressurized condition (0.09 Torr) and a Mn-Zn ferrite film 39 is formed on a disk substrate 1 (120 rpm) following heating to 400° C., and then the 1st valves 22 and 23 and the 2nd valves 27 and 28 are closed.

Further following this, by opening the 1st valve 24 and the 2nd valve 29 within a vacuum atmosphere, and introducing nitrogen carrier gas (flow rate at 7 SCCM into vaporizers) along with cobalt acetylacetonate vapor and iron acetylacetonate vapor into a reactive chamber 12, allowing them to react in a plasma (electric power 1.5 W/cm$^2$) for 8 minutes under depressed condition (0.07 Torr), a 3-layer film consisting of a Co ferrite/Mn-Zn ferrite/NiO is formed by putting a Co ferrite film 3 on the Mn-Zn ferrite film 39.

Then, taking out the glass disk substrate 1 which forms the 3-layer

Then, taking out the glass disk substrate 1 which forms the 3-layer film from a reaction chamber 12, and also forming the same 3-layer film on the back side in the same manner, a Co ferrite/Mn-Zn ferrite/NiO disk having a magnetic thin film on both sides was made.

After heat-treating this disk for 3 hours in a 300° C. air atmosphere, a magnetic recording medium of a magnetic rigid disk form was made by forming a lubricant layer 4 through an immersion in a liquid tank (not illustrated here) containing a fluorine-contained organic lubricant.

The magnetic recording medium thus obtained was evaluated for its electromagnetic transfer characteristics through use of the same magnetic head as used in embodiment 1 in the same manner. As a comparison specimen, the same two media as used in the embodiment 1 were also employed here.

Figure 12:
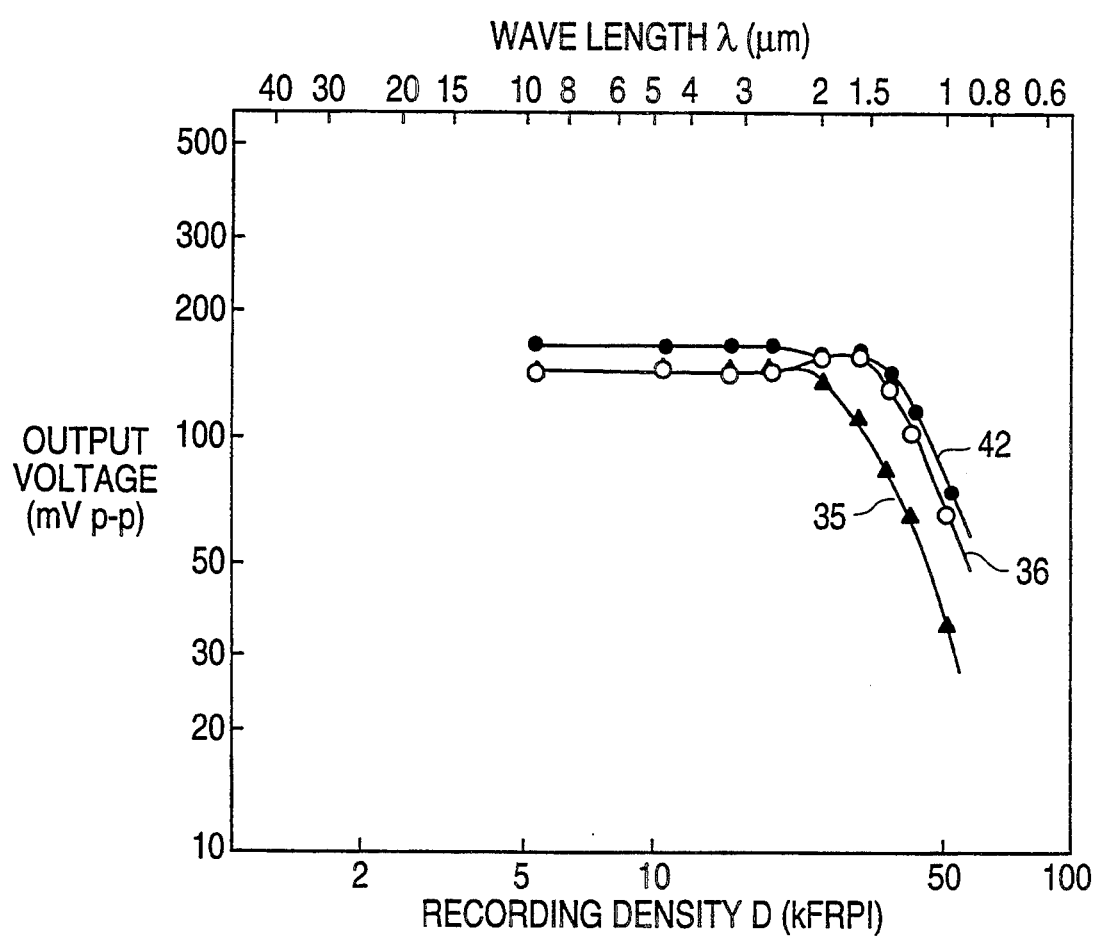
FIG. 12 shows a comparison diagram of the output voltage characteristics made by a magnetic head for a magnetic recording medium referred to as embodiment 5 of the present invention, a medium without an under layer film, and a conventional medium for comparison.

The relationships between output voltage and recording density or recording wave length of the respective media are shown in FIG. 12 for comparison.

In FIG. 12, numeral 42 represents the characteristics of the magnetic recording medium of the present embodiment, numeral 35 represents those of the conventional Co-Ni/Cr alloy thin film medium for comparison, and numeral 36 likewise represents those of the conventional Co ferrite monolayer medium, respectively.

From FIG. 12, it is clear that magnetic recording medium of the present embodiment show higher values of output voltage in general than the conventional Co-Ni/Cr alloy thin film medium, and the Co ferrite monolayer medium by comparison, and it was found that the magnetic recording medium was able to comply with higher recording density.

Besides, observation of an output voltage wave form at 500 KHz of recording signals of the magnetic recording medium of the present embodiment through an oscilloscope showed a dipulse wave form which contains a perpendicular magnetic recording component as its character.

After completing measurement of electromagnetic transfer characteristic, as a result of observation on the surface and a broken section of the magnetic recording medium of the present embodiment following the breaking thereof through a high-resolution scanning electron microscope (SEM), it has become clear that this 3-layer film showed a columnar structure with a columnar diameter of 500–900 Å at a film thickness of about 4,500 Å.

By making a NiO film 37, a Mn-Zn ferrite film 39 and Co ferrite film 3 in the same conditions as in the aforementioned embodiment on the glass disk substrate for comparison, and observing through the SEM in the same manner, the film thickness was determined to be about 1,000 Å for NiO film 37, about 1,500 Å for Mn-Zn ferrite film 39, and about 2,000 Å for Co ferrite film 3.

Furthermore, analysis of the composition of the Mn-Zn ferrite film 39 and Co ferrite film 3 through an X-ray micro-analyzer (EPMA) revealed that Mn/Zn/Fe=7/3/20, and Co/Fe=1/19.

In addition, measurement was made for the magnetic characteristics of the Mn-Zn ferrite film 39 and Co ferrite film 3 through a vibrating sample magnetometer (VSM). As a result, the characteristics of the Mn-Zn ferrite film 39 was Hc=45 Oe, Ms=320 emu/cc, the characteristics of the Co ferrite film 3 were Hc=1,200 Oe and Ms=280 emu/cc.

Besides, an analysis of crystal structure through the X-ray diffraction was carried out of a NiO film 37 used for an under layer revealed that it had a complete orientation to (100) of NaCl type crystal structure, and the orientation of (100) for any of Mn-Zn ferrite film 39 and Co ferrite film 3 had been improved in spinel crystal structure compared with the case when an under layer is not provided under the influence of the orientation of NiO film 37.

The reason why the magnetic recording medium of the present embodiment shows a higher output voltage in a high recording density side of a short wave length area than the Co-Ni/Cr alloy thin film medium is thought that it contains a perpendicular magnetic recording component, and also the reason why it shows higher output voltage than Co ferrite monolayer medium is that use of a soft magnetic material as Mn-Zn ferrite film decreased the influence of reversing magnetic field due to generation of a horseshoe magnetic circuit with the Co ferrite magnetic layer.

According to the aforementioned embodiment thus indicated above, as the NiO film 37 is formed on the disk substrate 1, the Mn-Zn ferrite film 39 thereon, and the Co ferrite layer 3 is further formed thereon, a magnetic rigid disk having the ability to carry out high density magnetic recording with excellent reliability for endurance and hardness.

Besides, by making a 3-layer film medium with use of CaO or MnO made in the same manner as in the embodiment 2 in place of NiO film 378, and various kinds of ferrite obtained in the same manner as in the embodiment 3 in place of Mn-Zn ferrite film 39 as a soft magnetic iron oxide thin film, as a result of the evaluation on the electromagnetic transfer characteristic, a higher value of output voltage was shown in general compared with the conventional Co-Ni/Cr alloy thin film medium in the same case as the magnetic recording medium consisting of a 3-layer film of Co ferrite/Mn-Zn ferrite/NiO of the present embodiment.

What is claimed is

1. A magnetic recording medium comprising:

a glass substrate disk;

an under layer formed on at least one surface of the glass substrate disk, said under layer comprising a layer of a spinel crystal structured magnetic iron oxide layer laminated on a layer of a sodium chloride crystal structured oxide layer, said spinel crystal structured magnetic iron oxide having a spinel crystal structure as determined by X-ray diffraction and comprising an iron oxide containing at least one element selected from the group consisting of zinc, manganese and nickel, and said sodium chloride crystal structured oxide having a sodium chloride crystal structure with crystal orientation in a <100> direction perpendicular to the surface of the glass substrate as determined by X-ray diffraction and containing at least one oxide selected from the group consisting of NiO, CoO and MnO;

a layer of a ferromagnetic Co-containing iron oxide formed on a surface of the under layer in the form of columnar grains which are densely arranged perpendicularly to the surface of the under layer, said ferromagnetic Co-containing iron oxide having a spinel crystal structure with crystal orientation in a <100> direction perpendicular to the surface of the under layer as determined by X-ray diffraction; and a lubricant layer formed on the layer of the ferromagnetic Co-containing iron oxide;

wherein the under layer is different from the layer of the ferromagnetic Co-containing iron oxide.

2. A magnetic recording medium as claimed in claim 1, in which the glass substrate disk is a disk-shaped glass substrate produced by press molding a heated glass material.

* * * * *